Oct. 15, 1935.　　O. A. BOSSART ET AL　　2,017,201

CONDENSER TUBE

Filed Nov. 27, 1931　　2 Sheets-Sheet 1

Witness:
V. Siljander

Inventors
Otto A. Bossart and
Emanuel G. Eberhardt
By
Hill & Hill
Attys.

Oct. 15, 1935.   O. A. BOSSART ET AL   2,017,201
CONDENSER TUBE
Filed Nov. 27, 1931   2 Sheets-Sheet 2
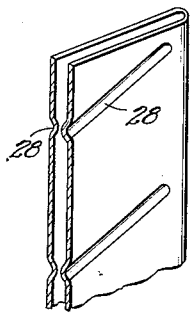
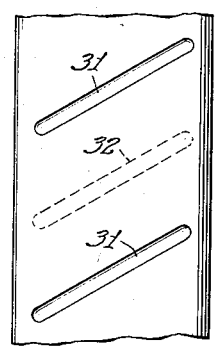
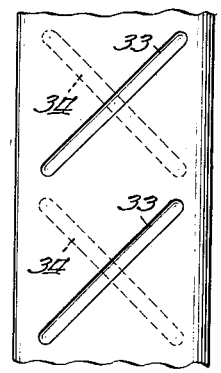
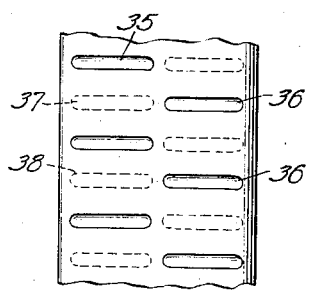
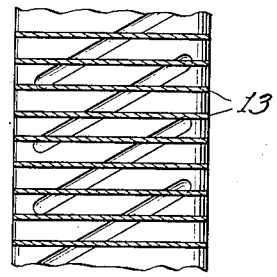

Patented Oct. 15, 1935

2,017,201

UNITED STATES PATENT OFFICE 2,017,201

CONDENSER TUBE

Otto A. Bossart and Emanuel G. Eberhardt, Racine, Wis., assignors to Modine Manufacturing Company, Racine, Wis., a corporation of Wisconsin Application November 27, 1931, Serial No. 577,560

7 Claims. (Cl. 257—262)

The invention relates to heat exchange devices which include in their construction tubular elements through which a liquid is circulated to transmit heat from the liquid circulating through the tubes and the fluid circulating through the heat exchange device.

The invention primarily relates to improvements in tubes employed in devices such as those above referred to and has among its objects to provide the tube with means whereby the heat exchanging efficiency of the tube is increased.

Another object of the invention is to construct the tube in a manner to provide restrictions in the passage of the tube at intervals of the length of the tube, the restrictions providing means for creating turbulence of the liquid passing through the tubes and providing means for increasing the velocity of the fluid circulating through the tube.

It is an object of the invention to provide tubes which are relatively narrow or elongated in cross section with means capable of functioning in the manner above referred to.

It is also an object of the invention to form the tube of sheet material and to form depressions at certain portions of the sheet and to fold the sheet in a manner to provide a tube having the elements above referred to.

Specifically, the invention has as an object indenting the one or both walls of a relatively flat tube at intervals of its length to provide inwardly projecting ribs which extend crosswise of the tube in spaced relation to the opposite wall of the tube in the path of the liquid flowing through the tube to thereby provide a turbulence creating rib and a passage at the rib which provides means at intervals of the length of the tube for increasing the velocity of the liquid and creating turbulence to thereby displace the liquid contacting with the inner portion of the tube and present another portion thereto to this portion of the tube to facilitate cooling of the fluid circulating through the tube.

It is an object to arrange these transverse depressions or ribs in various positions of angularity.

It is another object of the invention to provide a construction capable of accomplishing the above advantages without increasing the material of the tube.

Another object of the invention is to employ the means for obtaining the above and other advantages to strengthen the tube.

The invention also has as an object to provide a construction capable of functioning in the manner above referred to which will not materially interfere with contact between the tubes and heat radiating fins associated with the tubes.

Another object of the invention is to arrange the restrictions in the passages of the tubes so that they are located upon opposite sides of the central plane of the interior of the tube located midway between the side walls thereof to thus facilitate agitation of the fluid and consequently the rate of heat exchange.

The invention has these and other objects, all of which will be explained in detail and more readily understood when read in conjunction with the accompanying drawings which illustrate various embodiments of which the invention is susceptible, it being therefore manifest that other arrangements may be resorted to to accomplish the invention without departing from the spirit of the invention as expressed or defined in the appended claims forming a part hereof.

In the drawings, Fig. 1 is a front view of a portion of a heat exchange device having the invention applied thereto;

Fig. 8 is a section taken on line 8—8 of Fig. 5;

Fig. 9 is a side view of a portion of a tube illustrating a structure in which the indentations on opposite sides of the tube are inclined in the same direction, the indentations of one side of the tube being located between a pair of indentations provided in the opposite side of the tube;

Fig. 10 is a side view of a portion of a tube showing the indentations on one side of the tube arranged at one angle, the indentations in the opposite side arranged at another angle, the indentations on opposite sides of the tube crossing each other;

Fig. 11 is a side view of a portion of a tube in which the ribs are arranged in staggered relation; and Fig. 12 is a side view of a tube having heat radiating fins associated therewith.

Figure 1:
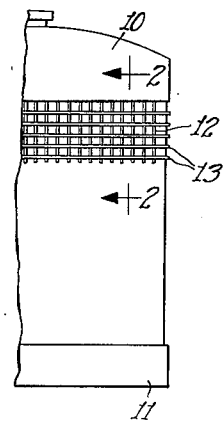

The invention as illustrated in Fig. 1 is shown as applied to a heat exchange device having tanks 10 and 11 located at opposite ends of the tubes 12, it being understood that the tubes communicate with the tanks and thus provide for circulation of liquid from one tank to the other. The tubes of the heat exchange device may, as illustrated, be provided with heat radiating fins 13 to further assist in causing a rapid transfer of heat from the liquid circulating through the tubes and the air circulating between the tubes.

Figure 7:
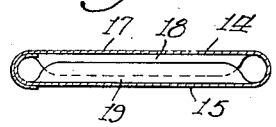
Fig. 7 is a transverse section of a tube constructed according to the invention.

Each of the tubes 12 is preferably formed of sheet material which is fashioned to provide a tube which is relatively flat or elongated in cross section as shown in Fig. 7 to thus provide relatively flat side walls 14 and 15, each of which is, in the present instance, provided with a plurality of spaced depressions which extend crosswise of the tubes and in an inwardly direction and provide ribs which are arranged relatively to a wall 15 to provide restricted spaces 18 through which liquid may circulate and thus travel from a tank such as 10 to the tank 11. The depressions formed in one wall are designated 16 and the ribs formed thereby are designated 17. It will be noted that the opposite wall such as 15 is also provided with a plurality of recesses providing inwardly projecting ribs designated 19 which extend inwardly toward the wall 14 in a manner similar to those described in connection with the recesses 16. It will also be noted that the ribs 17 of one wall are arranged in spaced relation on opposite sides of a rib such as 19 formed by the depression in the opposite wall and, therefore, fluid circulating through the tube will be caused to travel a circuitous path through the tube and will engage the ribs such as 17 and 19 and increase its velocity and create turbulence of the fluid. It is evident that turbulence of the liquid which is created by the ribs causes the liquid circulating through the tube to act upon the liquid engaging the inner face of the portions 21 of the tubes and will cause its removal and thus permit another portion of the liquid to be presented to the cooling action of these portions of the tube and thus facilitate cooling of the liquid.

It will be further noted that spaces or pockets such as 20 are produced and that these pockets are located upon opposite sides of each of the ribs formed by the depressions which will thus provide a space adjacent each of the ribs to which liquid is introduced through the passage 18 at an increased velocity causing turbulence to the liquid and subjecting said liquid while under turbulence to the cooling action of the surfaces 21 which are maintained at a cooling temperature by virtue of air circulating in contact therewith. It is evident that the ribs add to the strength of the tube to resist forces created internally of the tube and further that the means for creating turbulence is produced without the addition of material.

Figure 2:
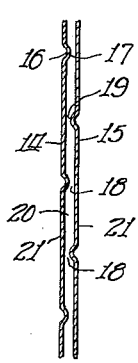
Fig. 2 is a section taken on the line 2—2 of Fig. 1 showing a fragment of one of the tubes as shown in Fig. 1.
Figure 3:
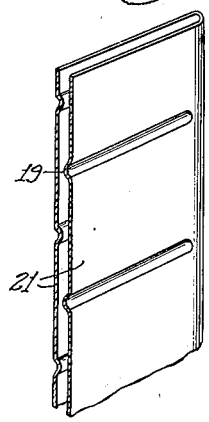
Fig. 3 is a perspective view partly in section of one of the tubes employed in the structure shown in Fig. 1.
Figure 4:
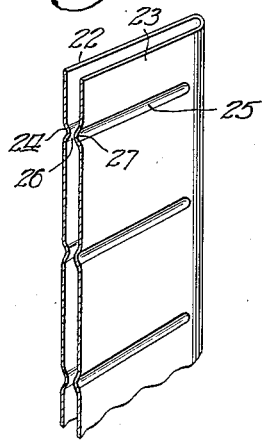
Fig. 4 is a view similar to Fig. 3 showing a modified arrangement which may be employed.
Figure 5:
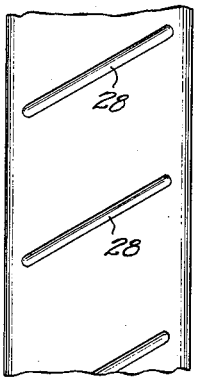
Figs. 5 and 6 are respectively side views of modified arangements which may be employed to accomplish the invention.
Figure 6:
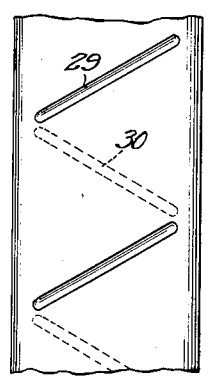

In the modified structure shown in Fig. 4, the opposite side walls 22 and 23 are each provided with a plurality of depressions 24 and 25 which produce ribs respectively designated 26 and 27, it being understood that a space is produced between the ribs so that fluid may circulate therebetween and travel through the tubes. It will be noted that in the modified structure shown in Fig. 4, the depressed portions which form the ribs 26 and 27 are located opposite each other, thus differing in structure from that illustrated in Fig. 2 in which the ribs 17 and 19 in opposite walls are arranged with the rib of one wall arranged between a pair of ribs provided in the other wall which disposes the passages 18 upon opposite sides of the central longitudinal plane of the interior of the tube. It will be further noted that the depressions 17 and 19, and 24 and 25 formed in the structures illustrated in Figs. 3 and 4 are arranged at right angles to the length of the tube, it being understood that the depressions may be arranged in this manner or arranged at an obtuse angle as illustrated in Figs. 5 and 6. In Fig. 5, the depressions 28 are located at an angle other than a right angle and thus differ from the structure shown in Figs. 3 and 4, it being understood that the ribs formed by these depressions may bear a relation to each other as illustrated in Fig. 3 or Fig. 4.

The structure shown in Fig. 6 also contemplates the utilization of a tube which is relatively flat in cross section, however, differs from the structure shown in Fig. 5 and others in that the opposite sides of the tube are respectively provided with depressions 29 and 30, the depressions 29 and 30 being arranged at an angle to each other.

It is further understood that the tube may be formed of sheet material which is bent as shown in Fig. 7 with the edges soldered, brazed or otherwise secured to complete the tube. When the tube is formed of sheet material and subsequently bent, the depressions which form the ribs and a wall of the relatively long narrow passages are produced in the sheet prior to forming the tube they being located in the sheet so that when the sheet is bent one or the other of the structures disclosed will result.

The structure illustrated in Fig. 9 contemplates arranging the depressions 31 in one side of the tube and providing depressions such as 32 in the opposite side of the tube with the depressions on opposite sides inclined in the same direction, the depression such as 32 on one side of the tube being located between the pair of depressions such as 31, thus differing from the structure shown in Fig. 5 in which the depressions are arranged at an incline, however, opposite each other as illustrated in Fig. 4.

In Fig. 10, the depressions such as 33 on one side of the tube are arranged at an incline relatively to the depressions such as 34 provided upon the opposite side of the tube, in other words, the depressions 33 and 34 in the structure shown in Fig. 10 cross each other.

In the arrangement shown in Fig. 11, the depressions such as 35 and 36 on one side of the tube are arranged in staggered relation and formed, respectively, at opposite sides of a longitudinal center line located midway between the edge portions of the tube, it being understood that the depressions 37 and 38 on the opposite side of this tube are also staggered and formed, respectively, at opposite sides of the center line between the edge portions of the tube, however, these last mentioned depressions may be arranged relatively to the depressions 35 and 36 as shown in dotted lines in Fig. 11 or the depressions such as 37 and 38 may be arranged opposite the depressions 35 and 36 as hereinbefore described in connection with other structures.

One of the advantages of the structure is that the surface contact loss between the tubes and fins is minimized, this feature being illustrated in Fig. 12, from an inspection of which it can be seen that the fins 13 contact with a substantial portion of the tubes and therefore the heat conducting efficiency of the fins and tubes will not be materially interfered with or reduced, it being manifest that a substantial portion of the tube is in contact with the major portion of the cross-sectional area of the fins. Since the depression forming the rib is distributed over a number of the fins, the major portion of the tube adjacent the fins will contact with the fin.

From the foregoing description of the various structures, it is manifest that the invention lends itself to the production of a tube having a plurality of restricted passages and ribs which provide means for creating turbulence of the fluid circulating through the tube and that this is accomplished without adding to the material of the tube. It is further manifest that by arranging the recess or rib provided in one side of the tube relatively to a flat portion such as 21 of the opposite side of the tube that relatively long and narrow restricted passages are provided upon opposite sides of the central longitudinal plane of the interior of the tube, which will assist in creating turbulence and velocity.

It is evident that turbulence of the fluid is further assisted because of the offset relation of the restricted passages 18 which will alternately cause the fluid to be directed towards the sides of the interior of the tubes, which change of course will cause agitation and turbulence of the fluid and thus increase the rate of heat exchange between the fluid circulating through the tube and the air circulating on the outside of the tube.

It is further manifest that as the fluid circulates through the tubes and is agitated, that this agitation causes a scrubbing action to be applied to the fluid adhering to the interior of the walls of the tubes which will thus remove this part of the fluid and allow a different portion of the fluid to be presented to the cooling effect of the air traveling across the tube. It is further manifest that the arrangement does not materially reduce area of contact between the fins and the tubes which also is of advantage since it tends to maintain the rate of heat exchange between the fluid circulating through the tubes and the air engaging the fins and tubes.

In addition to the above enumerated advantages, it can be seen that the ribs provide means which will add strength and resistance to pressure internally of the tube and furthermore that no obstruction is presented which will interfere with passing said tubes through apertures in the fins.

Having thus described the invention, what we claim and desire to cover by Letters Patent is:

1. In a heat exchange device, a plurality of independent parallel sheet metal tubes adapted for the passage of a fluid therethrough, each tube having a pair of substantially parallel walls, a plurality of inwardly extending transverse indentations formed in one wall of said tube in staggered relation and spaced from each other longitudinally of the tube and extending transversely to the direction of flow of fluid through the tubes, each indentation in one wall cooperating with the opposite wall of said tube to form a transverse restriction in the passage through said tube offset from the central plane of the tube.

2. In a heat exchange device, a plurality of independent parallel sheet metal tubes adapted for the passage of fluid therethrough, each tube having a pair of substantially parallel walls, a plurality of inwardly extending transverse projections upon the inner side of each wall of said tube and arranged in staggered relationship at opposite sides of the center line thereof and spaced from each other longitudinally of the tube and extending transversely to the direction of flow of fluid through the tubes, each of the projections on the respective walls cooperating with the opposite wall of said tube to form a transverse restriction in the passage through said tube, said restrictions being alternately positioned at opposite sides of the center line of said tube.

3. In a heat exchange device, a plurality of independent parallel sheet metal tubes adapted for the passage of fluid therethrough, each tube having a pair of substantially parallel walls, a plurality of inwardly extending transverse projections upon the inner side of each wall of said tube spaced transversely and longitudinally from each other and from the projections upon the opposite wall of said tube and extending transversely to the direction of flow of fluid through the tubes, each of the projections on the respective walls cooperating with the opposite wall of said tube to form a transverse restriction in the passage therethrough, said restrictions being alternately positioned at opposite sides of the central plane of said tube.

4. In a heat exchange device, a plurality of independent parallel sheet metal tubes adapted for the passage of fluid longitudinally therethrough, each tube having a pair of substantially parallel walls, a plurality of inwardly extending transverse projections upon the inner side of one wall of said tube spaced from each other longitudinally of the tube and extending transversely to the direction of flow of fluid through the tubes, each of said projections cooperating with a flat portion upon the opposite wall of said tube to form a transverse restriction of substantially uniform width in the passage through the tube and offset from the central plane thereof.

5. In a heat exchange device, a plurality of independent parallel sheet metal tubes adapted for the passage of fluid therethrough, each tube having a pair of substantially parallel walls, a plurality of staggered inwardly extending transverse indentations formed in each wall of said tube and spaced from each other longitudinally of the tube and extending transversely to the direction of flow of fluid through the tubes, each indentation in each wall cooperating with the opposite wall of said tube to form a transverse restriction in the passage therethrough, said restriction being offset from the central plane of said tube alternately at opposite sides of said central plane and at opposite sides of the center line of the tubes.

6. In a heat exchange device, a plurality of independent parallel sheet metal tubes adapted for the passage of fluid therethrough, each tube having substantially parallel walls, a plurality of staggered inwardly extending transverse indentations formed in each wall of said tube and spaced from each other and from the indentations formed in the opposite wall longitudinally of the tube and extending transversely to the direction of flow of fluid through the tubes, each indentation in each wall cooperating with the opposite wall of said tube to form a transverse restriction in the passage therethrough.

7. In a heat exchange device, a plurality of independent parallel sheet metal tubes adapted for the passage of fluid therethrough, each tube having a pair of substantially parallel walls, a plurality of inwardly extending transverse indentations formed in each wall of said tube and in staggered relation at opposite sides of the longitudinal center line thereof, the said indentations being spaced from each other and from the indentations formed in the opposite wall longitudinally of the tube and extending transversely to the direction of flow of fluid through the tubes, each indentation in each wall cooperating with a flat portion upon the opposite wall of said tube to form a transverse restriction in the passage therethrough of substantially uniform width, said restrictions being alternately positioned at opposite sides of the central plane of said tube.

OTTO A. BOSSART.
EMANUEL G. EBERHARDT.